(12) United States Patent
Jammes

(10) Patent No.: US 12,309,666 B2
(45) Date of Patent: May 20, 2025

(54) METHOD FOR LOCATING A MOBILE DEVICE IN A MULTIDIMENSIONAL SPACE AND CORRESPONDING INFRASTRUCTURE

(71) Applicant: Be Spoon, Le Bourget du Lac (FR)

(72) Inventor: Fabien Jammes, Brison St Innocent (FR)

(73) Assignee: Be Spoon, Le Bourget du Lac (FR)

( * ) Notice: Subject to any disclaimer, the term of this patent is extended or adjusted under 35 U.S.C. 154(b) by 380 days.

(21) Appl. No.: 17/825,782

(22) Filed: May 26, 2022

(65) Prior Publication Data

US 2022/0386077 A1 Dec. 1, 2022

(30) Foreign Application Priority Data

May 28, 2021 (FR) ...................... 2105612

(51) Int. Cl.
*H04W 4/029* (2018.01)
*H04W 56/00* (2009.01)

(52) U.S. Cl.
CPC ......... *H04W 4/029* (2018.02); *H04W 56/001* (2013.01)

(58) Field of Classification Search
CPC ..... H04W 4/029; H04W 56/001; G01S 5/021; G01S 5/14; G01S 5/0284
See application file for complete search history.

(56) References Cited

U.S. PATENT DOCUMENTS

| | | |
|---|---|---|
| 7,492,316 B1 | 2/2009 | Ameti et al. |
| 2001/0033627 A1 | 10/2001 | Syrjarinne |
| 2007/0176749 A1 * | 8/2007 | Boyd ............... H04W 64/00 340/13.24 |
| 2009/0213000 A1 | 8/2009 | Gross et al. |
| 2010/0277284 A1 | 11/2010 | Brown et al. |
| 2014/0111313 A1 | 4/2014 | Wild et al. |
| 2018/0156919 A1 | 6/2018 | Bieber et al. |
| 2018/0213492 A1 * | 7/2018 | Xia ................. H04B 1/7183 |

(Continued)

FOREIGN PATENT DOCUMENTS

| | | | | |
|---|---|---|---|---|
| CN | 101213473 A | 7/2008 | | |
| CN | 102595593 A | 7/2012 | | |
| CN | 104635205 A * | 5/2015 | ........... | G01S 5/06 |

(Continued)

*Primary Examiner* — Umair Ahsan
(74) *Attorney, Agent, or Firm* — Slater Matsil, LLP

(57) ABSTRACT

In an embodiment a method includes emitting at least one group of at least N+1 mutually temporally asynchronous synchronization signals from at least N+1 fixed emitting locations in a space, receiving the synchronization signals of the group by a mobile device and at at least one fixed receiving location in the space, determining a reception moment of each synchronization signal of the at least one group by the mobile device in a time base specific to the mobile device, determining a reception moment of the synchronization signals of the at least one group at the at least one receiving location in a time base specific to each receiving location, and determining a position of the mobile device in the space at a given moment based on the reception moments determined at the at least one receiving location, the reception moments determined by the mobile device, coordinates of the emitting locations in the space and a distance between each emitting location and the at least one receiving location.

19 Claims, 3 Drawing Sheets

(56) References Cited

U.S. PATENT DOCUMENTS

2020/0218235 A1    7/2020  Kiefer et al.
2022/0317236 A1*  10/2022  Dongare ................ G01S 1/024

FOREIGN PATENT DOCUMENTS

| CN | 105960018 A | 9/2016 |
|----|-------------|--------|
| DE | 102017120381 A1 | 3/2019 |
| EP | 1146349 A2 | 10/2001 |
| WO | 2016174018 A1 | 11/2016 |
| WO | 2020212599 A1 | 10/2020 |

* cited by examiner

[Fig 1]
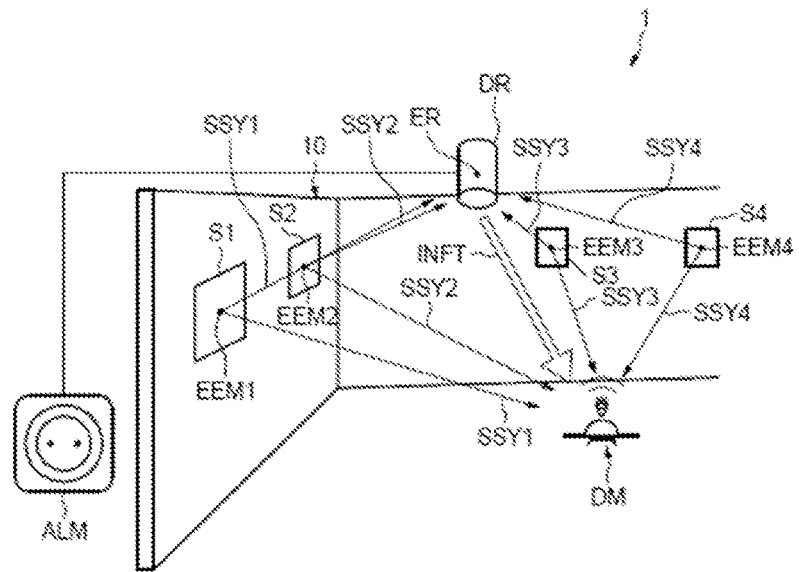
[Fig 2]
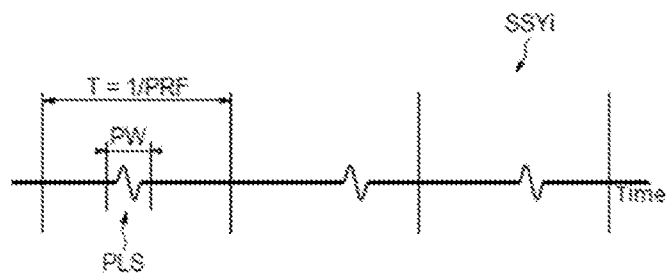
[Fig 3]
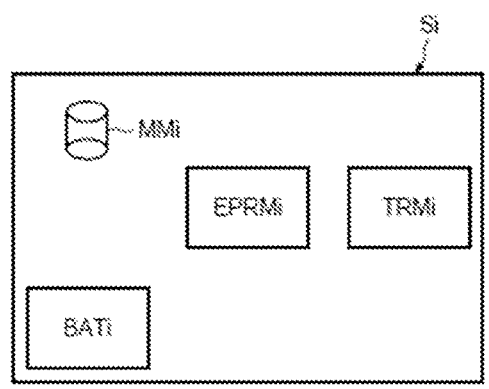

[Fig 4]
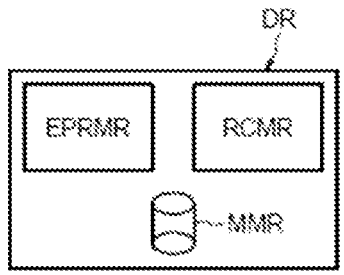
[Fig 5]
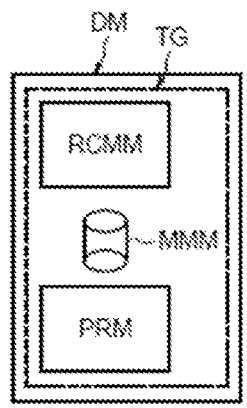
[Fig 6]
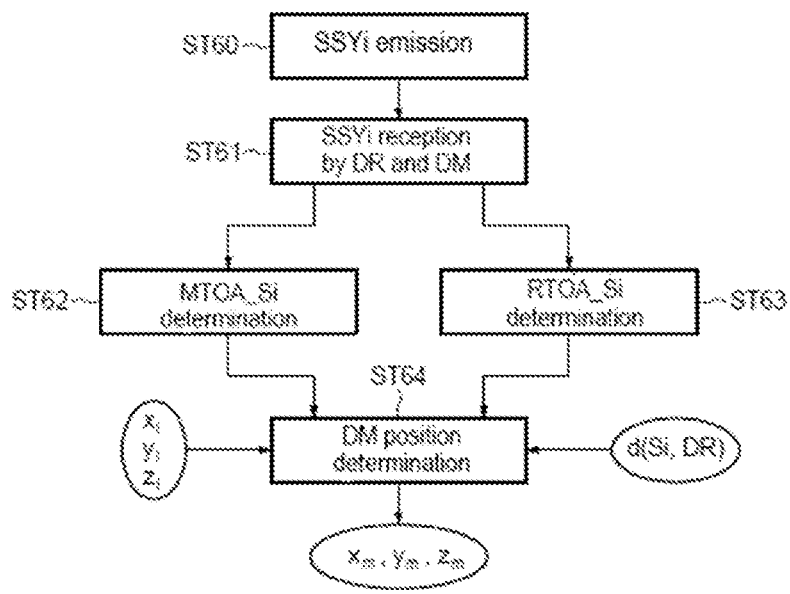

[Fig 7]
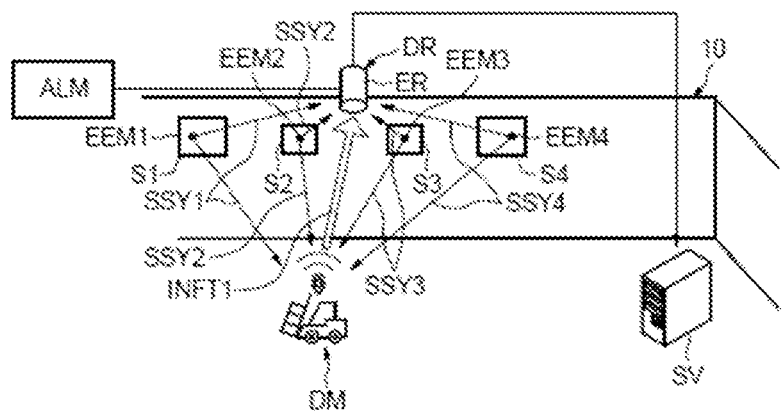
[Fig 8]
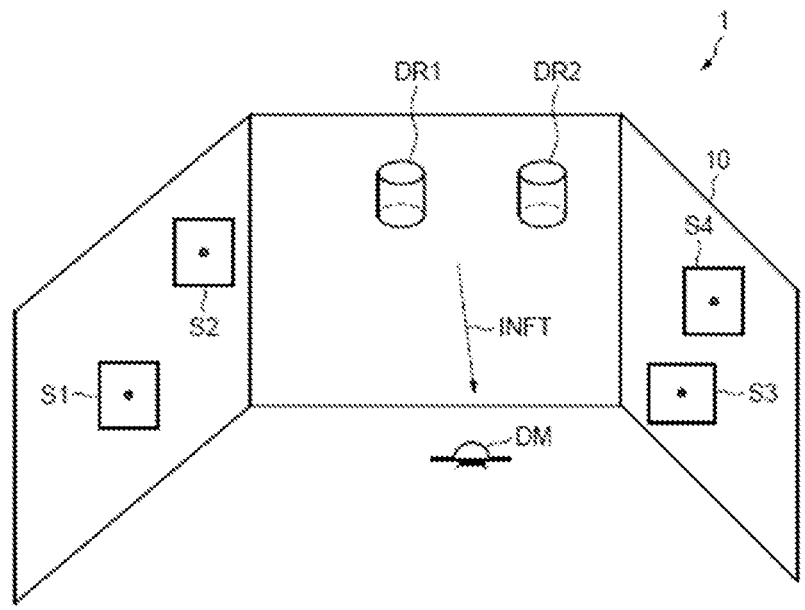

METHOD FOR LOCATING A MOBILE DEVICE IN A MULTIDIMENSIONAL SPACE AND CORRESPONDING INFRASTRUCTURE

CROSS-REFERENCE TO RELATED APPLICATIONS

This application claims the benefit of French Patent Application No. 2105612, filed on May 28, 2021, which application is hereby incorporated herein by reference.

TECHNICAL FIELD

Implementations and embodiments relate to the localization of a mobile device in a space, for example multidimensional space, that the position of the mobile device is determined by the mobile device itself or else by an entity distinct from the mobile device.

SUMMARY

In some applications, it may be interesting that a mobile device, for example a carriage, can be displaced autonomously in a multidimensional space, for example a hangar, for example to automatically search for objects, such as pallets or cartons, stored at determined places of the hangar, without hitting obstacles, for example the walls of the hangar.

In this regard, the position of the mobile device should be able to be accurately determined at any moment. And, this position can be determined by the mobile device itself or by an entity distinct from the mobile device, for example a server.

In this regard, the infrastructure includes several satellites or anchors, fixed on the walls of the hangar, and intended to periodically send ultra-wideband (UWB) signals so that the mobile device is capable of calculating its own position or that the position thereof can be permanently monitored by the server.

In such infrastructures, the satellites may be temporally mutually synchronized.

And, in order to obtain an accurate time synchronization, the satellites may either be synchronized using UWB signals or be synchronized using signals carried over cables connecting these satellites.

However, a synchronization using ultra-wideband signals implies, for each satellite, a reception of a high number of UWB frames, which implies a significant energy consumption. Therefore, the satellites may not be battery-powered, except to use batteries which are large, expensive, not compatible for example with the size of the satellites, and must be mains-powered, which is a drawback.

The use of cables between the satellites to allow the time synchronization thereof, represents a significant portion of the cost of the infrastructure.

It would also be possible to use atomic clocks at each satellite, to allow their time synchronization. However, such clocks are expensive.

Therefore, there is a need to propose an infrastructure allowing an accurate localisation of a mobile device within it at an industrially acceptable cost.

According to one embodiment, it is proposed to use, in combination with satellites intended solely to emit signals called synchronization signals, which are mutually temporally unsynchronized (asynchronous), a fixed receiver device intended to receive these synchronization signals in the same way as the mobile device.

The synchronization signals are emitted in time bases which are specific to the satellites and each having a time offset relative to an absolute reference time. As the synchronization signals are mutually unsynchronized, their respective time base are not synchronized, that is to say, there is no determined relationship between the respective time offsets involving for example the distances between the points of emission of these synchronization signals.

Moreover, the moments of emission of these time signals, which depend on the time offsets of the respective time bases specific to the satellites, are not known.

The fixed receiver device is also unsynchronized with the satellites, that is to say that it receives the synchronization signals in a time base of its own, unsynchronized with the time bases of the satellites and with a time offset relative to the absolute time, also unknown.

The mobile device is also unsynchronized with the satellites, that is to say that it receives the synchronization signals in a time base of its own, unsynchronized with the time bases of the satellites and with a time offset, also unknown, depending on the time offset of its time base relative to the absolute time.

Since the synchronization signals emitted by the satellites are not temporally synchronized with each other, the mobile device cannot determine its position from these synchronization signals because it lacks time information. And it is then the fixed receiver device which will transmit the missing time information to the mobile device, generated from the reception, by the fixed device, of these synchronization signals, so that the mobile device can determine its position.

Conversely, if the fixed device, or else an entity coupled to the fixed device, wishes to determine the position of the mobile device, it cannot do it from the sole reception of the synchronization signals emitted by the satellites. And in this case, it is the mobile device which will transmit, to the fixed device, the missing time information which will allow the fixed device to determine the position of the mobile device.

And, since the satellites only emit synchronization signals and that consequently, they do not need to go into reception mode to listen to signals in order to be temporally synchronized, they can be easily powered on battery, for example of small size, because their energy consumption is significantly decreased relative to satellites having to be placed in reception mode in order to be temporally synchronized.

According to one embodiment, a method for locating a mobile device in a space of dimension N is proposed, N being greater than or equal to 1.

Generally, N is equal to 3, the space then being a three-dimensional space, for example a hangar.

The method according to this embodiment comprises an emission of at least one group of at least N+1 mutually temporally asynchronous synchronization signals from respectively at least N+1 fixed emission locations in said space.

For example, the synchronization signals are emitted by emitting devices, or satellites, located at these emission points, and advantageously battery-powered.

Of course, the number of synchronization signals can be greater than N+1.

The method also comprises a reception of the synchronization signals of said at least one group by the mobile device and at at least one fixed receiving location in said space.

A receiver device can be fixed to each receiving location.

The method also comprises a determination of the reception moment of each synchronization signal of said at least one group by the mobile device in a time base specific to the mobile device.

The method also comprises a determination of the reception moment of the synchronization signals of said at least one group at said at least one receiving location in a time base specific to each receiving location.

Of course, it would be possible to provide several fixed receiving locations and therefore several receiver devices.

The method also comprises a determination of the position of the mobile device in said space at a given moment, from reception moments determined at said at least one receiving location, the reception moments determined by the mobile device, the coordinates of the emitting locations in said space and the distance between each emitting location and said at least one receiving location.

And, this determination of the position of the mobile device can be determined by the mobile device itself or else by a receiver device, or an entity coupled to this receiver device, located at a fixed receiving location.

A group of at least N+1 emitted synchronization signals allows determining the position of the mobile device at a given moment.

Within the group, these N+1 synchronization signals can for example be emitted successively or else for at least some of them simultaneously on different channels.

The method advantageously comprises emissions of successive groups of N+1 synchronization signals and a determination of the position of the mobile device at successive moments respectively associated with said successive groups.

It is thus possible to permanently determine and/or monitor the position of the mobile device.

According to one embodiment, time information obtained from the reception moments determined at said at least one receiving location is transmitted to the mobile device from said at least one receiving location so that the mobile device is capable of determining itself the position thereof.

This time information may for example be the reception moments themselves determined at said at least one receiving location, or else the differences between these reception moments.

Alternatively, time information can be obtained from the reception moments determined by the mobile device and then be transmitted by the mobile device to said at least one receiving location so that a third party entity, distinct from the mobile device and coupled to said at least one receiving location, is capable of determining the position of the mobile device.

Of course, this third party entity can be a receiver device located at the receiving location or else, for example, a server coupled to this receiver device.

Although this is not absolutely necessary, it is particularly advantageous that the synchronization signals are ultra-wideband signals.

Indeed, such signals allow an accurate determination of their reception moment by the mobile device or the fixed reception device(s).

As for the time information transmitted either from the mobile device to the fixed receiver device or from the fixed receiver device to the mobile device, it can preferably also be transmitted within ultra-wideband signals.

However, it could also be transmitted by any other means, for example by using Bluetooth technology or by Wi-Fi for example.

According to another embodiment, an infrastructure is proposed, comprising
a space of dimension N, N being greater than or equal to 1,
at least N+1 emitter devices respectively located at at least N+1 fixed emitting locations in said space and configured to emit at least one group of at least N+1 respective mutually temporally asynchronous synchronization signals,
at least one receiver device located at at least one fixed receiving location in said space and configured to receive the synchronization signals and to determine the reception moment of the synchronization signals in a time base specific to each receiver device,
a mobile device configured to receive each synchronization signal and determine the reception moment of each synchronization signal in a time base specific to the mobile device, and
processing means configured to determine the position of the mobile device at a given moment in said space, from the reception moments determined by said at least one receiver device, the reception moments determined by the mobile device, the coordinates of the emitting locations in said space and the distance between each emitting location and said at least one receiving location.

According to one embodiment, the mobile device incorporates said processing means, and said at least one receiver device is configured to generate time information from the reception moments determined by said at least one receiver device and to transmit this time information to the mobile device so that the mobile device is capable of determining itself the position thereof.

Alternatively, the infrastructure includes a third party entity, distinct from the mobile device, coupled to said at least one receiver device (and which may be the or one receiver device itself) and incorporating the processing means.

The mobile device is then configured to generate time information from the reception moments determined by the mobile device and to transmit this time information to said at least one receiver device so that the third party entity is capable of determining the position of the mobile device.

The time information is advantageously transmitted within ultra-wideband signals.

The emitter devices are also advantageously configured to emit successive groups of N+1 synchronization signals, and the processing means are configured to determine the position of the mobile device at successive moments respectively associated with said successive groups.

It is possible that the infrastructure includes several reception devices.

This is in particular the case when the multidimensional space is too large for a single fixed receiver device to be capable of receiving the synchronization signals emitted by all emitter devices or satellites.

These receiver devices can in this case be mutually temporally synchronized.

Alternatively, at least some of the receiver devices can be mutually temporally asynchronous.

It is also possible to use a receiver device to synchronize the other asynchronous receiver devices.

As indicated above, the synchronization signals emitted by the emitter devices are advantageously ultra-wideband signals.

The emitter devices are advantageously battery-powered.

According to another embodiment, an emitter device belonging to the infrastructure as defined above is also proposed.

According to another embodiment, a receiver device belonging to the infrastructure as defined above is proposed.

BRIEF DESCRIPTION OF THE DRAWINGS

Other advantages and features of the invention will become apparent on examining the detailed description of implementations and embodiments, which are in no way limiting, and of the appended drawings in which:

FIG. 1 shows a system for determining a position of a mobile device according to an embodiment;

FIG. 2 illustrates synchronization signal as ultra-wideband (UWB) signals;

FIG. 3 schematically illustrates an architecture of an emitter device or satellite according to an embodiment;

FIG. 4 schematically illustrates an architecture of the receiver device according to an embodiment;

FIG. 5 schematically illustrates an architecture of the mobile device according to an embodiment;

FIG. 6 shows a method for determining a position of a mobile device according to an embodiment;

FIG. 7 shows a system for determining a position of a mobile device according to a further embodiment; and FIG. 8 illustrates a system for determining a position of a mobile device according to a yet further embodiment.

DETAILED DESCRIPTION OF ILLUSTRATIVE EMBODIMENTS

In FIG. 1, the reference 1 designates an infrastructure or system, including in this example, a premise 10 defining a three-dimensional space.

A mobile device DM is intended to be displaced inside the premise 10 and it is desired to determine the position thereof in the premise 10.

In the example illustrated in FIG. 1, it is the mobile device DM itself which will determine the position thereof.

The infrastructure 1 includes in this example four emitter devices, or satellites, S1-S4 respectively located at four emitting locations EEM1-EEM4, fixed in the three-dimensional space. In this regard, the satellites can be fixed on one or more wall(s) of the premise and possibly on the ceiling thereof.

The coordinates of each satellite in three-dimensional space are known. The four satellites S1-S4 are configured to emit successive groups of four respective synchronization signals SSY1-SSY4, which are mutually temporally asynchronous.

Although only four satellites have been represented herein, it would, of course, be quite possible that the infrastructure 1 comprises a larger number of satellites Si.

As illustrated more particularly in FIG. 3, which will be discussed in more detail below, each satellite Si is herein powered by means of a battery BATi.

In the exemplary embodiment of FIG. 1, the infrastructure 1 also includes a receiver device DR located at a fixed receiving location ER in said space 10.

This receiver device is configured to receive the synchronization signals SSYi and to determine the moments of reception of these synchronization signals SSYi in a time base specific to the receiver device DR.

Although the receiver device DR can be battery-powered, the receiver device DR is herein powered on a mains power supply ALM.

Moreover, as will be seen in more detail below, so that the mobile device DM can determine the position thereof in the space 10, and since the synchronization signals SSYi are mutually asynchronous, time information INFT, the content of which will be discussed in more detail below, are transmitted from the receiver device DR to the mobile device DM.

As illustrated in FIG. 2, the synchronization signals SSYi are herein ultra-wideband (UWB) signals.

The ultra-wideband type technology is well known to the person skilled in the art and is distinguished from narrow band and low-spread spectrum technologies in that the bandwidth of the ultra-wideband type signal is typically comprised between about 25% and about 100% of the centre frequency.

Moreover, instead of transmitting a continuous carrier modulated with information or with information combined with a spreading code, which determines the bandwidth of the signal, the ultra-wideband technology provides the transmission of a series of very narrow pulses PLS.

These extremely short pulses in the time domain, transformed in the frequency domain, lead to obtaining the ultra-wideband spectrum characteristic of UWB technology.

These pulses PLS have a known theoretical form.

They have a predetermined time width PW, for example in the range of 2 nanoseconds. The successive pulses PLS are respectively contained in successive time windows of length T equal to the inverse of the pulse repetition frequency (PRF).

As an indication, the length T of each time window is for example equal to 50 nanoseconds.

The position of each pulse in a time window can vary from one window to the other depending on a pseudo-random code.

The pulses PLS have characteristics of an ultra-wideband type pulse in that the ratio of the bandwidth half-power pulse to the centre frequency is greater than a quarter. As an indication, the centre frequency of a pulse can vary between two and ten GHz.

Several possibilities exist for encoding the transmitted information.

Thus, it is possible to use a position modulation (PPM modulation).

In this case, when the signal carries the information encoded with such a position modulation, the pulse may be slightly advanced or slightly delayed relative to the reference position of the pulse in the window, depending on the value 0 or 1 of the transmitted information.

It is also possible to use reverse polarity encoding of the pulses.

In a manner which is conventional and known per se, each ultra-wideband synchronization signal SSY is emitted in a UWB frame format.

This UWB frame format can include the following sections:

- a synchronization header (SHR) with a preamble and a start frame delimiter (SFD),
- a physical layer header (PHR) containing information on the length of the frame, the data rate and information allowing performing correction of transmission errors. The physical layer header is also used to decode the payload field (Physical Layer: PHY) containing in particular the payload data to be transmitted.

These payload data can include, in addition to the type of frame, an identifier of the emitter device of the frame.

Moreover, the start frame delimiter (SFD) can be used to detect the reception moment of the frame with a high accuracy.

FIG. 3 schematically illustrates an architecture of an emitter device or satellite Si.

Such an architecture is conventional and known per se.

More specifically, the satellite Si includes elementary processing means EPRMi, for example a microcontroller, intended in particular to develop the content of the UWB frames forming the synchronization signals SSYi.

This information is then transmitted to transmission means TRMi, of conventional structure, allowing the transmission of the signal SSYi in accordance with the UWB technology.

Memory means MMi can incorporate the identifier of the satellite Si as well as the coordinates xi, yi and zi thereof in the space 10.

This information can for example be transmitted within the synchronization signal SSYi transmitted by the satellite Si.

Moreover, as indicated above, a battery BATi powers the satellite Si.

FIG. 4 schematically illustrates the architecture of the receiver device DR.

This includes receiving means RCMR, of a structure which is conventional and known per se, intended to receive and process the received UWB frames.

The information contained in these frames is processed by elementary processing means EPRMR, such as a microcontroller.

As will be explained in more detail below, this elementary processing means EPRMR will in particular determine the moment of reception of each received synchronization signal and perform calculations, the content of which will be discussed in more detail below.

The receiver device DR also includes a memory MMR intended, for example, to contain the coordinates of the different satellites in the space 10.

FIG. 5 schematically illustrates the architecture of the mobile device DM.

This includes herein a transponder or tag TG also containing an elementary processing means PRM, for example a microcontroller, as well as receiving means RCMM, of a structure which is conventional and known per se, intended for receiving and processing the UWB frames and transmitting the useful information they contain to the elementary processing means PRM.

Here again, the elementary processing means PRM will perform calculations, the content of which will be discussed in more detail below.

The transponder TG may also include a memory MMM also containing, for example, the coordinates of the satellites Si in the space.

Reference is now made more particularly to FIG. 6, to describe an embodiment of the method.

In a step ST60, the synchronization signals SSYi are emitted and are received, in a step ST61, by the fixed receiver device DR and by the mobile device DM.

In step ST62, the reception moments MTOA_Si of the synchronization signals by the mobile device are determined.

Likewise, in step ST63, the moments RTOA_Si of the synchronization signals by the receiver device are determined.

The position of the mobile device DM in the space 10, that is to say the coordinates xm, ym and zm thereof, is determined in step ST64 from the reception moments MTOA_Si, RTOA_Si, the coordinates xi, yi, zi of the satellites Si, and the distance d(Si, DR) between each satellite Si and the receiver device DR.

This position is determined by processing means.

This position of the mobile device DM can be determined by the mobile device DM itself (in this case the elementary processing means PRM incorporate the processing means) or else by the receiver device DR (in this case the elementary processing means EPRMR incorporate the processing means) or else an entity such as a server, coupled to this receiver device DR (in this case the third party entity incorporates the processing means).

The example of FIG. 1 is now taken, where the position of the mobile device DM is determined by the device DM itself.

The reception moments MTOA_Si of the synchronization signals by the mobile device DM in its own time base are defined by the equations EQ1 below.

$$MTOA\_S1 = t\_S1 + d(S1,DM)/c - t\_DM$$

$$MTOA\_S2 = t\_S2 + d(S2,DM)/c - t\_DM$$

$$MTOA\_S3 = t\_S3 + d(S3,DM)/c - t\_DM$$

$$MTOA\_S4 = t\_S4 + d(S4,DM)/c - t\_DM$$

In these equations, d(Si, DM) designates the distance between the satellite Si and the mobile device DM.

c designates the speed of propagation of the synchronization signals, herein the speed of light.

t_Si designates the moment of emission of the synchronization signal SSYi emitted by the satellite Si in its own time base.

This emission moment t_Si, depending on the time offset of the time base specific to the satellite Si relative to an absolute time, is unknown.

t_DM designates a time offset depending on the time offset of the time base specific to the mobile device DM relative to an absolute time.

Again, this time offset is unknown.

The reception moment MTOA_Si is the duration separating the moment when the mobile device starts listening and the moment of reception of the corresponding synchronization signal SSYi.

As previously indicated, this reception moment is determined, for example, using the start frame delimiter SFD mentioned above.

The distance d(Si, DM) is defined by the equation EQ2 below.

$$d(Si,DM) = [(x_i - x_m)^2 + (y_i - y_m)^2 + (z_i - z_m)^2]^{1/2}$$

It is seen that the set of equations EQ1 below includes eight unknowns, namely the time offsets t_Si, the time offset t_DM and the coordinates of the mobile device DM.

By performing differences between these reception moments, the unknown parameter t_DM can be eliminated as shown in the set of equations EQ3 below.

$$MTDOA\_1 = MTOA\_S1 - MTOA\_S2 = t\_S1 - t\_S2 + d(S1,DM)/c - d(S2,DM)/c$$

$$MTDOA\_2 = MTOA\_S2 - MTOA\_S3 = t\_S2 - t\_S3 + d(S2,DM)/c - d(S3,DM)/c$$

MTDOA_3=MTOA_S3−MTOA_S4=t_S4−t_S4+d(S3,DM)/c−d(S4,DM)/c

MTDOA_4=MTOA_S4−MTOA_S1=t_S1−t_S1+d(S4,DM)/c−d(S1,DM)/c

However, it is noted that, in this set of equations EQ3, the differences t_Si−t_Sj always remain unknown parameters.

This is the reason why the mobile device DM, which is able to determine the differences of moments MTDOA_i cannot determine the coordinates $x_m$, $y_m$ and $z_m$ of the mobile device DM.

These unknown parameters will be able to be determined from the moments of reception of the synchronization signals SSYi by the receiver device DR in its own time base.

More specifically, these reception moments RTOA_Si are defined by the set of equations EQ4 below.

RTOA_S1=t_S1+d(S1,DR)/c−t_DR

RTOA_S2=t_S2+d(S2,DR)/c−t_DR

RTOA_S3=t_S3+d(S3,DR)/c−t_DR

RTOA_S4=t_S4+d(S4,DR)/c−t_DR

The different distances d(Si, DR) are known since the coordinates of the satellites and the receiver device DR in the space 10 are known.

The unknown parameters are therefore the time offset t_DR and the emission moments t_Si.

By performing differences between these reception moments, the differences t_Si−t_Sj can be determined, as shown in the set of equations EQ5 below.

t_S1−t_S2=RTOA_S1−RTOA_S2+d(S2,DR)/c−d(S1,DR)/c t_S2−t_S3=RTOA_S2−RTOA_S3+d(S3,DR)/c−d(S2,DR)/c t_S3−t_S4=RTOA_S3−RTOA_S4+d(S4,DR)/c−d(S3,DR)/c t_S4−t_S1=RTOA_S4−RTOA_S1+d(S1,DR)/c−d(S4,DR)/c

The reception moments RTOA_Si therefore form for example the time information INFT (FIG. 1) transmitted from the receiver device to the mobile device allowing the mobile device to determine the differences t_Si−t_Sj.

Indeed with reference to these differences calculated above in the set of equations EQ3 above, the elementary processing means PRM of the mobile device can therefore solve the set of equations EQ3 and determine the position xm, ym and zm of the mobile device.

Of course, it would be possible, instead of transmitting these reception moments RTOA_Si, to directly transmit the differences RTOA_Si−RTOA_Sj mentioned in the set of equations EQ5 above.

Other combinations are possible to form the time information INFT.

Reference is now made more particularly to FIG. 7, which illustrates an alternative embodiment and implementation in which it is a server SV for example, connected to the receiver device DR, which will determine the position of the mobile DM.

Again, in a manner analogous to what has been described above, the satellites Si emit, in order to determine the position of the mobile device at a moment t, a group of respective synchronization signals SSYi, received by the receiver device DR and by the mobile device DM.

But this time, as indicated above, the processing means which will determine the position of the mobile device are incorporated in the elementary processing means EPMPR of the receiver device DR or else in the server.

And, this time, these processing means will need time information INFT1 which will be transmitted from the mobile device DM to the receiver device DR.

The moments of reception RTOA_Si of the synchronization signals SSYi by the receiver device DR in its own time base are again defined by the set of equations EQ4 above.

The difference in these reception moments allows defining the differences of the parameters t_Si−t_Sj as defined by the set of equation EQ5 above.

It is possible to transfer these differences t_Si−t_Sj in the set of equations EQ3, but the receiver device DR cannot complete these equations because it lacks the information MTOA_Si−MTOA_Sj.

Consequently, in this alternative implementation and embodiment, the time information INFT1 transmitted from the mobile device to the receiver device DR can be either the moments MTOA_Si of reception of the synchronization signals SSY by the mobile device, or the differences MTOA_Si−MTOA_Sj, or any other combination allowing generating the time information INFT1.

With this information, the elementary processing means PRM of the receiver device can solve the set of equations EQ3 and determine the coordinates xm, ym and zm of the mobile device.

A group of signals SSYi allows determining the position of the mobile device DM at a given moment. In practice, the satellites then successively emit several groups of N+1 (herein four) synchronization signals SSYi so as to be able to determine the position of the mobile device DM permanently.

Moreover, so that the mobile device DM or the receiver device DR can determine within a group of signals SSYi which satellite is associated with a received synchronization signal, it is possible for example to use the identifier of the satellite contained in the transmitted synchronization signal.

Alternatively, if a time division multiple access (TDMA) method is used, it is possible to then assign to the different satellites, different time intervals, within which they will emit their synchronization signals. And, the mobile device and the receiver device knowing these time intervals can determine, upon reception of a synchronization signal, the satellite associated therewith.

FIG. 8 illustrates another possible embodiment of an infrastructure.

In this example, several fixed receiver devices are provided, herein two receiver devices DR1, DR2.

This is particularly the case when the premise 10 is too large so that a single receiver device can only receive the synchronization signals transmitted by the satellites.

It is assumed in this example that it is the mobile device which will determine itself the position thereof.\

In this case, in a manner similar to what has been described above, the device DM will need time information INFT supplied by at least one of the receiver devices DR1, DR2.

In this regard, the moments of reception of the synchronization signals will be used by the receiver devices DR1 and DR2.

More specifically, it is assumed herein that the receiver device DR1 is not capable of receiving the synchronization signal SSY4 from the satellite S4 and that the device DR2 is not capable of receiving the synchronization signal SSY3 from the satellite S3.

The moments of reception R1TOA_Si of the other synchronization signals by the first receiver device DR1 are defined by the equations EQ7 below.

$$R1TOA\_S1 = t\_S1 + d(S1,DR1)/c - t\_DR1$$

$$R1TOA\_S2 = t\_S2 + d(S2,DR1)/c - t\_DR1$$

$$R1TOA\_S3 = t\_S3 + d(S3,DR1)/c - t\_DR1$$

The moments of reception R2TOA_Si of the other synchronization signals received by the second receiver device DR2 are defined by the set of equations EQ8 below.

$$R2TOA\_S1 = t\_S1 + d(S1,DR2)/c - t\_DR2$$

$$R2TOA\_S2 = t\_S2 + d(S2,DR2)/c - t\_DR2$$

$$R2TOA\_S3 = t\_S4 + d(S3,DR2)/c - t\_DR2$$

From the equations EQ7 the set of equations EQ9 below can be deduced therefrom, allowing obtaining t_Si−t_S2 and t_S2−t_S3.

$$t\_S1 - t\_S2 = R1TOA\_S1 - R1TOA\_S2 - d(S1,DR1)c + d(S2,DR1)/c$$

$$t\_S2 - t\_S3 = R1TOA\_S2 - R1TOA\_S3 - d(S2,DR1)c + d(S3,DR1)/c$$

From the set of equations EQ8 the set of equations EQ10 below can be deduced therefrom, allowing defining t_Si−t_S2 and t_S4−t_Si.

$$t\_S1 - t\_S2 = R2TOA\_S1 - R2TOA\_S2 - d(S1,DR2)/c + d(S2,DR2)/c$$

$$t\_S4 - t\_S1 = R2TOA\_S4 - R2TOA\_S1 - d(S4,DR2)/c + d(S1,DR2)/c$$

The sets of equations EQ7 and EQ8 also allow obtaining the equation EQ11 below defining the difference t_S3−t_S4.

$$t\_S3 - t\_S4 = R1TOA\_S3 - R2TOA\_S4 - d(S3,DR1) + d(S4,DR2) + t\_DR1 - t\_DR2$$

It is seen in this equation EQ11 that the term t_DR1−t_DR2 is present.

However, since the two devices DR1 and DR2 are temporally synchronized, this difference in the time offsets is known or measured and for example equal to the distance between the two devices DR1 and DR2 divided by the speed c.

And, as indicated above, with reference to the differences in time offsets defined by the equations EQ9 to EQ11 in the set of equations EQ3, the elementary processing means PRM of the mobile device can determine the position xm, ym and zm of the mobile device DM.

Thus, in this implementation, the time information INFT transmitted to the mobile device are for example the reception moments of the synchronization signals R1TOA_Si and R2TOA_Si mentioned in the equations EQ9 to EQ11, or the differences between these times of reception, or any other suitable combination.

If the two receivers DR1 and DR2 are not synchronized, the difference t_DR1−t_DR2 is unknown. A third receiver device can then be added which will be used to send an estimate of this difference t_DR1−t_DR2.

The invention is not limited to the implementations and embodiments which have just been described but encompasses all variants thereof.

It would be possible to provide a larger number of satellites emitting successive groups of corresponding synchronization signals, in particular in the case of large premises.

In this case, the different satellites will be positioned so that the mobile device and the receiver device(s) always receive groups of at least four synchronization signals.

What is claimed is:

1. A method for locating a mobile device in a space of dimension N, N being greater than or equal to 1 and less than or equal to 3, the method comprising:
   emitting at least one group of at least N+1 mutually temporally asynchronous synchronization signals from at least N+1 fixed emitting locations in the space;
   receiving the synchronization signals of the group by the mobile device and at at least one fixed receiving location in the space;
   determining a reception moment of each synchronization signal of the at least one group by the mobile device in a time base specific to the mobile device;
   determining a reception moment of the synchronization signals of the at least one group at the at least one receiving location in a time base specific to each receiving location; and
   determining a position of the mobile device in the space at a given moment based on the reception moments determined at the at least one receiving location, the reception moments determined by the mobile device, coordinates of the emitting locations in the space and a distance between each emitting location and the at least one receiving location.

2. The method according to claim 1, wherein time information obtained from the reception moments determined by the at least one receiving location is directly transmitted to the mobile device from the at least one receiving location so that the mobile device is capable of determining its position.

3. The method according to claim 2, wherein the time information is transmitted within ultra-wideband signals.

4. The method according to claim 1, wherein time information obtained from the reception moments determined by the mobile device is transmitted by the mobile device to the at least one receiving location so that a third party entity, distinct from the mobile device and coupled to the at least one receiving location, is capable of determining the position of the mobile device.

5. The method according to claim 1, wherein emitting successive groups of N+1 synchronization signals and determining the position of the mobile device at successive moments are respectively associated with the successive groups.

6. The method according to claim 1, wherein the synchronization signals are ultra-wideband signals.

7. The method according to claim 1, wherein the synchronization signals are emitted by battery-powered emitter devices.

8. The method according to claim 1, wherein N is equal to 3.

9. A system comprising:
   a space of dimension N, N being greater than or equal to 1 and less than or equal to 3;
   at least N+1 emitter devices located at at least N+1 fixed emitting locations in the space and configured to emit at least one group of at least N+1 respective mutually temporally asynchronous synchronization signals;
   at least one receiver device located at at least one fixed receiving location in the space and configured to receive the synchronization signals and to determine a first reception moment of the synchronization signals in a time base specific to each receiver device;

a mobile device configured to receive each synchronization signal and to determine a reception moment of each synchronization signal in a time base specific to the mobile device; and a processor configured to determine a position of the mobile device at a given moment in the space based on the reception moments determined by the at least one receiver device, the reception moments determined by the mobile device, coordinates of the emitting locations in the space and a distance between each emitting location and the at least one receiving location.

10. The system according to claim 9, wherein the mobile device comprises the processor, wherein the at least one receiver device is configured to generate time information from the reception moments determined by the at least one receiver device and to directly transmit the time information to the mobile device so that the mobile device is capable of determining its location.

11. The system according to claim 10, wherein the time information is transmitted within ultra-wideband signals.

12. The system according to claim 9, further comprising:

a third party entity, distinct from the mobile device, coupled to the at least one receiver device, wherein the third party entity comprises a processor, and wherein the mobile device is configured to:
generate time information from the reception moments determined by the mobile device, and
transmit the time information to the at least one receiver device so that the third party entity is capable of determining the position of the mobile device.

13. The system according to claim 9, wherein the emitter devices are configured to emit successive groups of N+1 synchronization signals, and wherein the processor is configured to determine the position of the mobile device at successive moments respectively associated with the successive groups.

14. The system according to claim 9, wherein the at least one receiver device comprises several receiver devices.

15. The system according to claim 14, wherein the receiver devices are mutually temporally synchronized.

16. The system according to claim 14, wherein at least some of the receiver devices are mutually temporally asynchronous.

17. The system according to claim 9, wherein the synchronization signals are ultra-wideband signals.

18. The system according to claim 9, wherein the emitter devices are battery-powered.

19. The system according to claim 9, wherein N is equal to 3.

* * * * *